(12) United States Patent
Santoni (10) Patent No.: US 12,157,280 B2
(45) Date of Patent: Dec. 3, 2024

(54) MULTI-STAGE RESIN DELIVERY

(71) Applicant: McLaren Automotive Limited, Woking (GB)

(72) Inventor: Claudio Santoni, Woking (GB)

(73) Assignee: MCLAREN AUTOMOTIVE LIMITED, Woking (GB)

(*) Notice: Subject to any disclaimer, the term of this patent is extended or adjusted under 35 U.S.C. 154(b) by 0 days.

(21) Appl. No.: 16/613,362

(22) PCT Filed: May 15, 2018

(86) PCT No.: PCT/GB2018/051309
§ 371 (c)(1),
(2) Date: Nov. 13, 2019

(87) PCT Pub. No.: WO2018/211258
PCT Pub. Date: Nov. 22, 2018

(65) Prior Publication Data
US 2020/0094496 A1    Mar. 26, 2020

(30) Foreign Application Priority Data
May 15, 2017   (GB) ...................... 1707760

(51) Int. Cl.
*B29C 70/46* (2006.01)
*B29C 70/48* (2006.01)
*B29K 63/00* (2006.01)
*B29K 105/08* (2006.01)
*B29K 307/04* (2006.01)

(52) U.S. Cl.
CPC .............. *B29C 70/46* (2013.01); *B29C 70/48* (2013.01); *B29K 2063/00* (2013.01); *B29K 2105/089* (2013.01); *B29K 2307/04* (2013.01)

(58) Field of Classification Search
CPC ....... B29C 70/48; B29C 45/561; B29C 70/46; B29C 70/342; B29C 70/345; B29C 70/467
(Continued)

(56) References Cited

U.S. PATENT DOCUMENTS 3,028,284 A * 4/1962 Reeves ................... B29C 70/48
                                                       156/215
5,023,041 A   6/1991 Jones et al.
(Continued)

FOREIGN PATENT DOCUMENTS

| | | |
|---|---|---|
| DE | 102014005847 A1 | 10/2015 |
| JP | H0647771 A | 2/1994 |
| WO | 0220256 A1 | 3/2002 |

OTHER PUBLICATIONS

Nishida (English Translation of JP 4414801) (Year: 2010).*
(Continued)

*Primary Examiner* — Michael A Tolin
*Assistant Examiner* — Hana C Page
(74) *Attorney, Agent, or Firm* — Kilpatrick Townsend & Stockton LLP (57) ABSTRACT

A method for forming a composite component, the method comprising: providing a mould (15) comprising a first part (8) of the mould and a second part (13) of the mould, the first part (8) and second part (13) when assembled define an exterior surface of the composite component; loading the first part (8) of the mould with reinforcing material (20); injecting matrix precursor into the first part (8) of the mould to impregnate reinforcing material (20) located in the first part (8) of the mould with matrix precursor; closing the second part (13) of the mould and the first part (8) of the mould around the reinforcing material (20) and matrix precursor to assemble the first part (8) and second part (13) to define an exterior surface of the composite component;

(Continued)

and injecting matrix precursor into the closed mould to impregnate reinforcing material (20) located between the first and second parts (8, 13) of the mould with matrix precursor.

20 Claims, 8 Drawing Sheets

(58) Field of Classification Search
 USPC .......................................................... 264/511
 See application file for complete search history.

(56) References Cited

U.S. PATENT DOCUMENTS

| 5,906,782 | A | 5/1999 | Blanchard et al. | |
| 9,248,586 | B2* | 2/2016 | Perrier | B29D 99/0014 |
| 2006/0220273 | A1* | 10/2006 | Armstrong | B29C 70/46 |
| | | | | 264/257 |
| 2011/0192531 | A1 | 8/2011 | Sekido et al. | |
| 2014/0154458 | A1* | 6/2014 | Zilberman | B64C 1/1461 |
| | | | | 428/99 |
| 2016/0082635 | A1* | 3/2016 | Kobayashi | B29C 45/0005 |
| | | | | 264/257 |
| 2016/0083086 | A1 | 3/2016 | Stamps et al. | |
| 2017/0232647 | A1* | 8/2017 | Astefanous | B29C 45/0003 |
| | | | | 264/257 |
| 2019/0315079 | A1* | 10/2019 | Boyer | B29C 70/48 |

OTHER PUBLICATIONS

Search Report for GB1707760.3 mailed Oct. 26, 2017.
Search Report & Written Opinion for WO2018/211258 mailed Aug. 23, 2018.

* cited by examiner

MULTI-STAGE RESIN DELIVERY

This invention relates to a method for forming a composite component using a multi-stage injection process.

It is known to manufacture components from fibre-reinforced composite (FRC) materials. Such materials typically comprise a matrix that contains reinforcing fibres. As an example, the matrix could be an epoxy resin and the fibres could be carbon fibre (CF) strands. Materials of this type can have good strength in comparison to their weight. However, the processes required to make components from fibre-reinforced materials can be complex.

One process for forming FRC components is resin transfer moulding (RTM). In this process the reinforcing fibres are laid up in a mould cavity, liquid resin is injected into the mould cavity and the resin is cured, typically by heating the mould body. Once the resin has become solid the mould can be opened and the resulting component removed. The resin can be injected by drawing a vacuum in the mould cavity and allowing the vacuum to pull the resin into the mould. The resin can be injected under pressure and drawing the vacuum in the mould cavity can reduce air entrapment and porosity in the resulting component. The resin can also be injected by depositing the resin into the mould cavity whilst the mould is open and then closing the mould on to the resin. Excess resin is squeezed out of the mould during the closing of the mould and/or excess resin can be collected in appropriately designed flash areas adjacent to the reinforcing fibres in such a way that such flash area can be trimmed off the moulded component after moulding. The mould cavity can be defined by rigid mould tools, which has the advantage of giving good control over the dimensional accuracy and surface finish of the component. Furthermore, long fibre runs, and woven mats of fibres can be embedded in the matrix, giving the end component great strength. RTM can be used for major structural components, such as vehicle tubs, as described in EP 2 772 416.

The injecting of the resin into the mould whilst drawing a vacuum is a significant process step, in terms of time, in the RTM process. This is because the resin needs to be injected in a controlled way to ensure full wetting of the reinforcing fibres with the resin. The longer the time needed for the resin to wet out the reinforcing fibres means that the start of the curing of the resin itself has to be delayed for a longer period. This puts a limit on how reactive the resin system can be when moulding components of large dimensions and/or significant three dimensional geometrical complexity because the resin needs to be in a non-cured state until it has fully wetted the reinforcing fibres. A less reactive resin system can mean a slower curing cycle which impacts on how fast the overall RTM cycle time can be.

Depositing and then compressing the resin by closing the mould can be inaccurate as the resin flow cannot be accurately controlled. In addition, dispensing and then compressing the resin by closing the mould is easier to control when the resin is dispensed on a mould tool with reasonably horizontal and flat surfaces with reinforcing fibres laid on. Any non-flat or non-horizontal portions or the reinforcing fibres are wetted out by resin that is forced in to those regions by compression. This is difficult to control accurately and so this technique is usually not used on components of large dimensions and/or with significant three dimensional geometrical complexity.

It is therefore desirable for there to be an improved method of injecting resin into a mould.

According to a first aspect of the present invention there is provided a method for forming a composite component, the method comprising: providing a mould comprising a first part of the mould and a second part of the mould, the first part and second part when assembled define an exterior surface of the composite component; loading the first part of the mould with reinforcing material; injecting matrix precursor into the first part of the mould to impregnate reinforcing material located in the first part of the mould with matrix precursor; closing the second part of the mould and the first part of the mould around the reinforcing material and matrix precursor to assemble the first part and second part to define an exterior surface of the composite component; and injecting matrix precursor into the closed mould to impregnate reinforcing material located between the first and second parts of the mould with matrix precursor.

The method may comprise, prior to injecting matrix precursor into the first part of the mould, positioning the second part of the mould so that the second part of the mould seals against the first part of the mould and that the first part and second part are not assembled to define the exterior surface of the composite component. The method may comprise injecting matrix precursor into the first part of the mould to impregnate reinforcing material located in the first part of the mould by injecting matrix precursor between the first part of the mould and the second part of the mould. Injecting matrix precursor into the first part of the mould to impregnate reinforcing material located in the first part of the mould may comprise reducing pressure of air between the first part and the second part.

Injecting matrix precursor into the first part of the mould to impregnate reinforcing material located in the first part of the mould may comprise injecting matrix precursor into the first part of the mould whilst the second part of the mould is not in contact with the first part of the mould. Injecting matrix precursor into the first part of the mould may comprise depositing matrix precursor using a dispensing device separate from the mould. Injecting matrix precursor into the first part of the mould may comprise injecting matrix precursor through a channel in the second part of the mould.

Injecting matrix precursor into the first part of the mould to impregnate reinforcing material located in the first part of the mould may comprise injecting a first quantity of matrix precursor into the first part of the mould whilst the second part of the mould is not in contact with the first part of the mould; and the method may further comprise: positioning the second part of the mould, subsequent to injecting a first quantity of matrix precursor, so that the second part of the mould seals against the first part of the mould and that the first part and second part are not assembled to define the exterior surface of the composite component; and injecting a second quantity of matrix precursor between the first part of the mould and the second part of the mould to impregnate reinforcing material located between the first part of the mould and second part of the mould. Injecting a second quantity of matrix precursor between the first part of the mould and the second part of the mould to impregnate reinforcing material located between the first part of the mould and second part of the mould may comprise reducing pressure of air between the first part and the second part. Injecting a first quantity of matrix precursor may comprise injecting matrix precursor through a first channel in the mould and injecting a second quantity of matrix cursor may comprise injecting matrix precursor through a second channel in the mould. Injecting matrix precursor into the closed mould may comprise injecting matrix precursor through a third channel in the mould.

The method may comprise closing the second part of the mould and first part of the mould around the reinforcing material and matrix precursor by moving the first and second parts of the mould closer together. Closing the second part of the mould and the first part of the mould around the reinforcing material and matrix precursor may cause the second part of the mould to contact with matrix precursor. Causing the second part of the mould to contact with matrix precursor may cause matrix precursor to impregnate reinforcing material not previously impregnated with matrix precursor. Causing the second part of the mould to contact with matrix precursor may cause matrix precursor to fill space between the first part of the mould and the second part of the mould not previously filled with matrix precursor.

Injecting matrix precursor into the closed mould may cause all the reinforcing material located between the first and second parts of the mould to be impregnated with matrix precursor. The first part of the mould may comprise a plurality of mould tool pieces. The second part of the mould may comprise a plurality of mould tool pieces. The method may comprise, subsequent to injecting the matrix precursor into the closed mould, curing the matrix precursor. The method may comprise opening the first part of the mould and second part of the mould; and removing the composite component. The method may comprise loading the first part of the mould with at least one support element to support reinforcing material in the first part of the mould. Injecting matrix precursor into the closed mould may comprise reducing the pressure within the closed mould.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for forming a composite component. The method may comprise: providing a mould comprising a first part of the mould and a second part of the mould, the first part and second part when assembled define an exterior surface of the composite component. The method may comprise loading the first part of the mould with reinforcing material; and injecting matrix precursor into the first part of the mould to impregnate reinforcing material located in the first part of the mould with matrix precursor. The method may further comprise closing the second part of the mould and the first part of the mould around the reinforcing material and matrix precursor to assemble the first part and second part to define an exterior surface of the composite component; and injecting matrix precursor into the closed mould to impregnate reinforcing material located between the first and second parts of the mould with matrix precursor.

Figure 1:
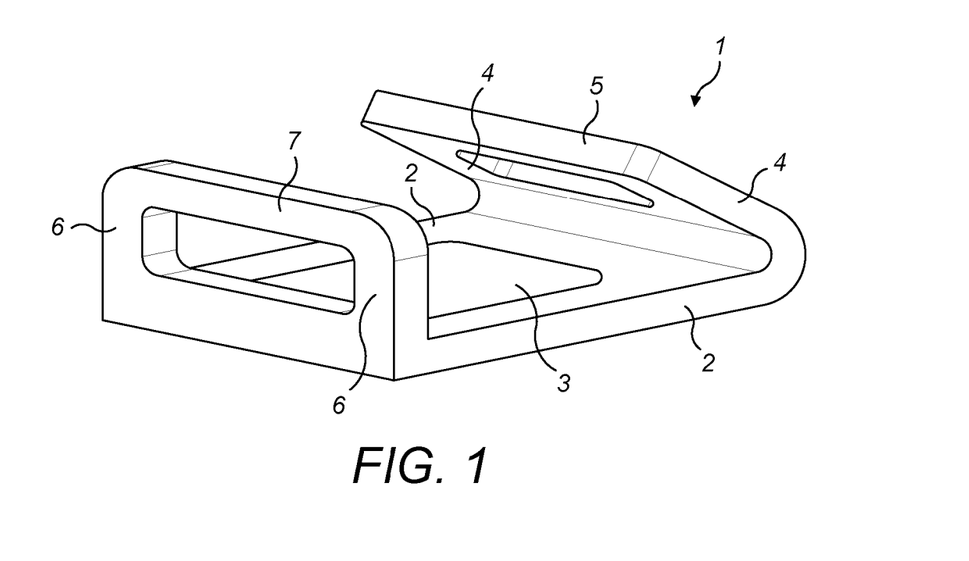
FIG. 1 shows an example of a vehicle tub manufactured by resin transfer moulding.

FIG. 1 shows an example of a carbon fibre reinforced part formed by resin transfer moulding. A vehicle tub 1 has a frame comprising side sills 2 which run along the sides of the tub. A floor 3 extends between the sills. At the front of the tub frame A-pillars 4 rise from the sills. The upper ends of the A-pillars are joined by a cross-member 5. At the rear of the tub frame C-pillars 6 rise from the sills. The C-pillars are joined by a cross-member 7. The sills, pillars and cross-members are formed as hollow tubes. This can be achieved by inflating a bladder, or other support element, within each tube during the RTM process. Inflation could occur by means of a gas or liquid being injected into the support element. Alternatively, the support element may be rigidized by filling it with a medium, such as a granulated material, and applying a vacuum so that the skin of the support element conforms to the medium. The RTM process involves laying up long fibre reinforcement in a mould, injecting a matrix precursor into the mould, curing the matrix precursor to form a rigid matrix around the reinforcing fibres and removing the resulting component from the mould. The RTM mould defines the exterior shape of the RTM component.

The walls forming the tub frame are formed of rigid, cured epoxy resin in which are embedded long runs of carbon fibre. The fibre could be in the form of tow, mats or individual fibres. The mean length of the fibres in the walls could be greater than 25 mm or more preferably greater than 50 cm. The fibres are laid up in a way that strengthens the tub frame against the stresses expected to be imposed on it in use. Typically, most parts of the walls will contain multiple layers of reinforcing fibre. In each tubular element of the tub frame the fibres may run generally longitudinally and/or generally circumferentially. Fibres running generally circumferentially are known as hoop fibres.

The reinforcing fibre may have been pre-impregnated with resin (prepreg). These reinforcing fibres may be laid up in the mould cavity. The reinforcing fibres may be in the form of mats of reinforcing fibre that have been pre-impregnated with resin (prepreg). The pre-impregnated resin may be used to hold the reinforcing fibres in a particular shape. Further resin may be injected into the mould before the resin is then cured.

Figure 2:
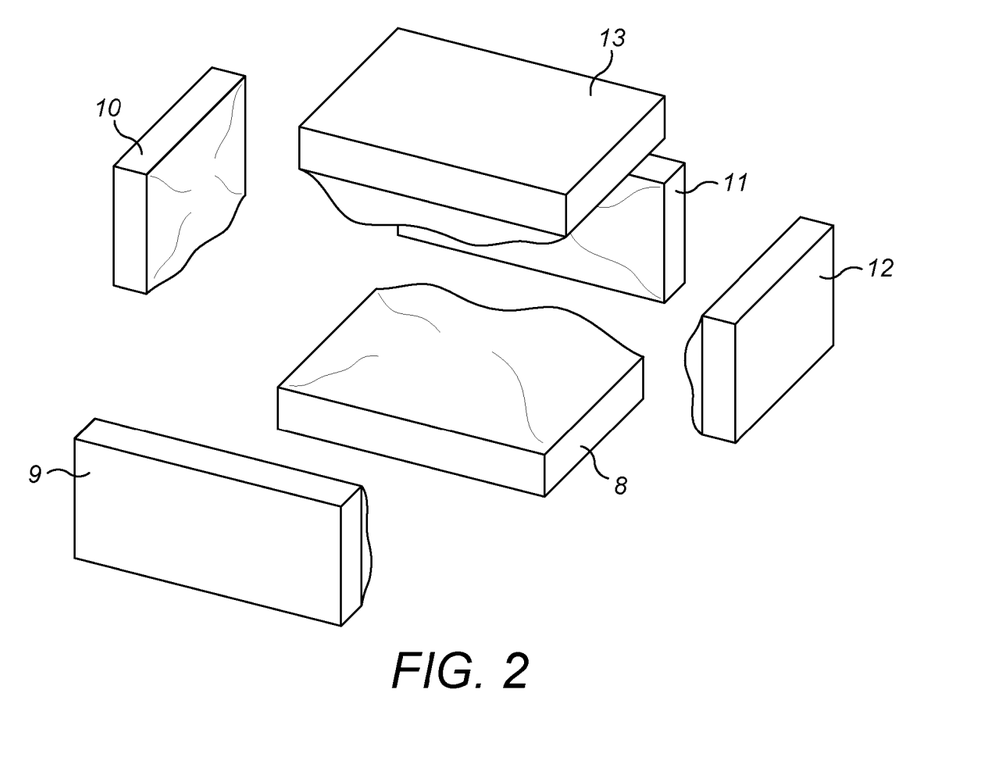
FIG. 2 shows the tool parts comprising a mould tool when separated.
Figure 3:
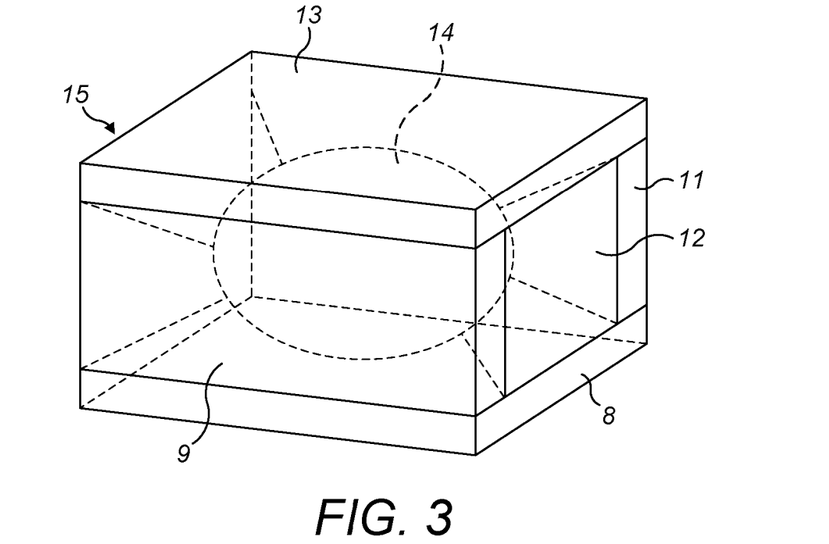
FIG. 3 shows the tool parts when assembled to define a mould cavity.

FIG. 2 shows an example of a mould tool 15 used to manufacture a moulded part, and in particular a vehicle tub. The mould tool 15 comprises a plurality of parts. In this example, the mould tool comprises a base part 8, side wall parts 9, 10, 11, 12 and top part 13, as shown in FIG. 2. The side wall parts 9, 10, 11, 12 may define the laterally extending elements of the moulded part. The tool parts, when assembled, define at least part of the exterior of the moulded part 14, as shown in FIG. 3. When assembled, the tool parts may define at least part of the exterior surface of the moulded part 14. The tools parts may be assembled together when they fit together to form a mould cavity within. It will be appreciated that the mould tool 15 may have any number of parts so as to define the exterior of the moulded part 14, but may generally have at least two parts.

Figure 4A:
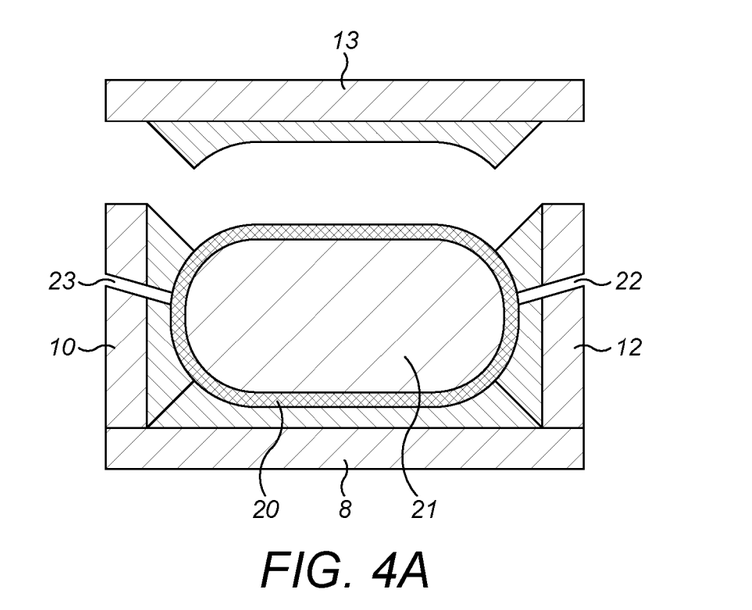
FIG. 4A shows a cut through view of the mould tool.
Figure 4B:
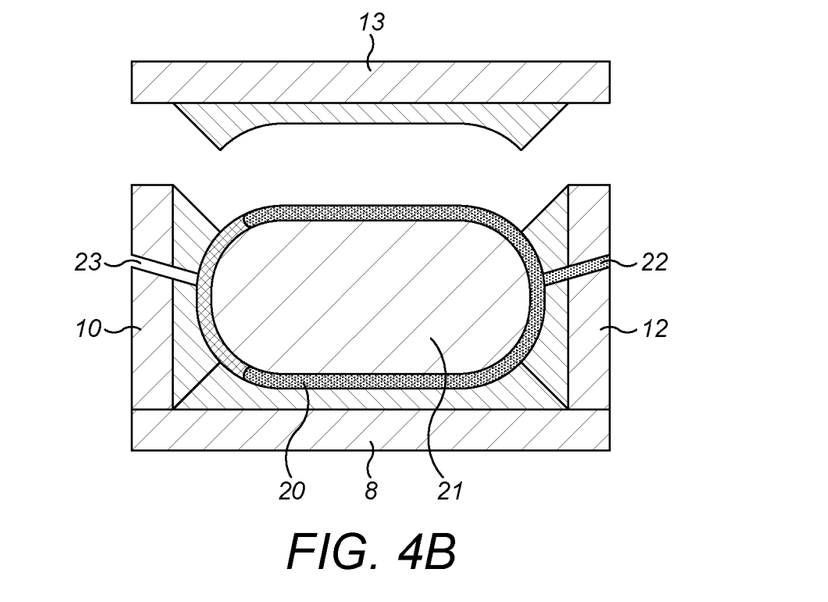
FIG. 4B shows a cut through view of the mould tool with a first stage of resin injection.
Figure 4C:
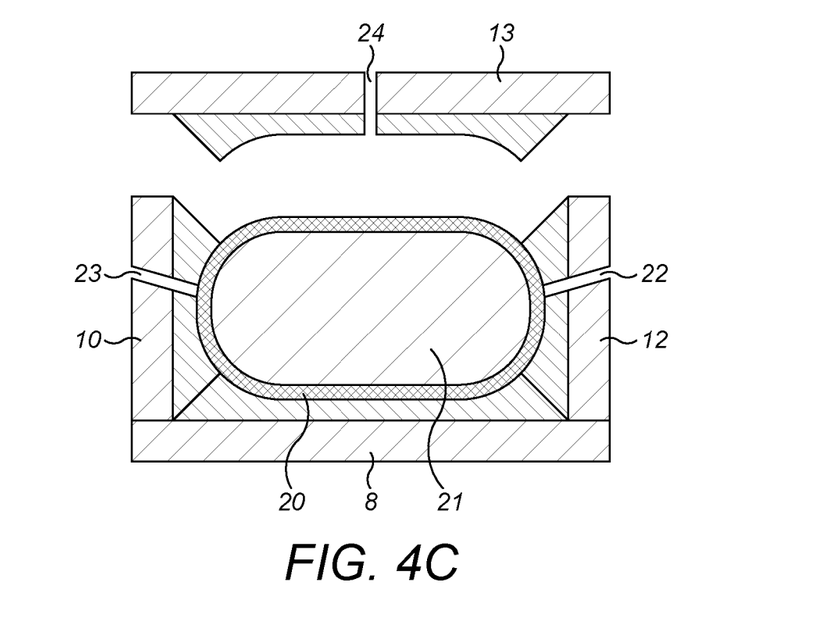
FIG. 4C shows a cut through view of the mould tool comprising an injection port in a second part of the mould tool.
Figure 4D:
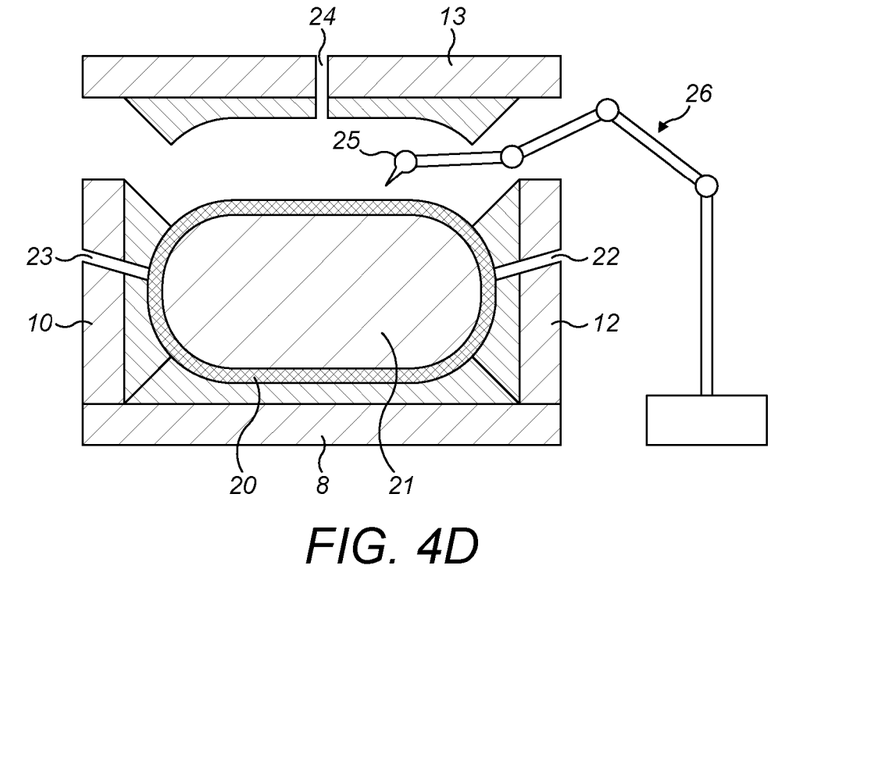
FIG. 4D shows a cut through view of the mould tool and a dispensing device.
Figure 5A:
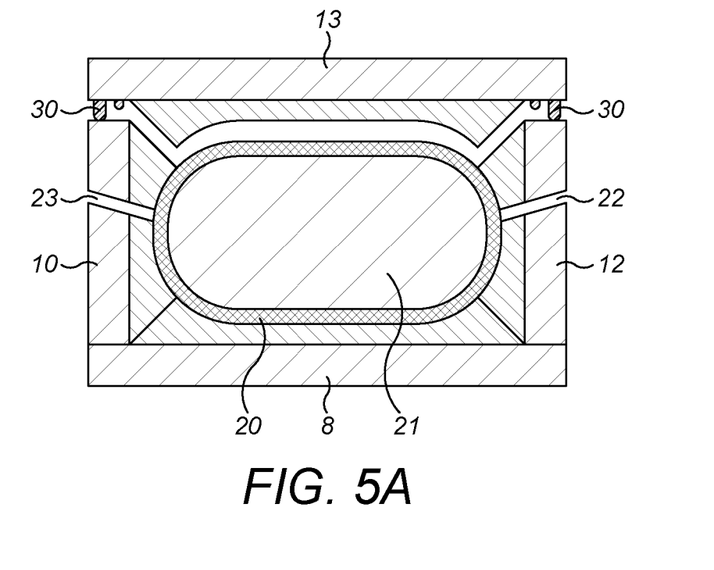
FIG. 5A shows a cut through view of the mould tool.
Figure 5B:
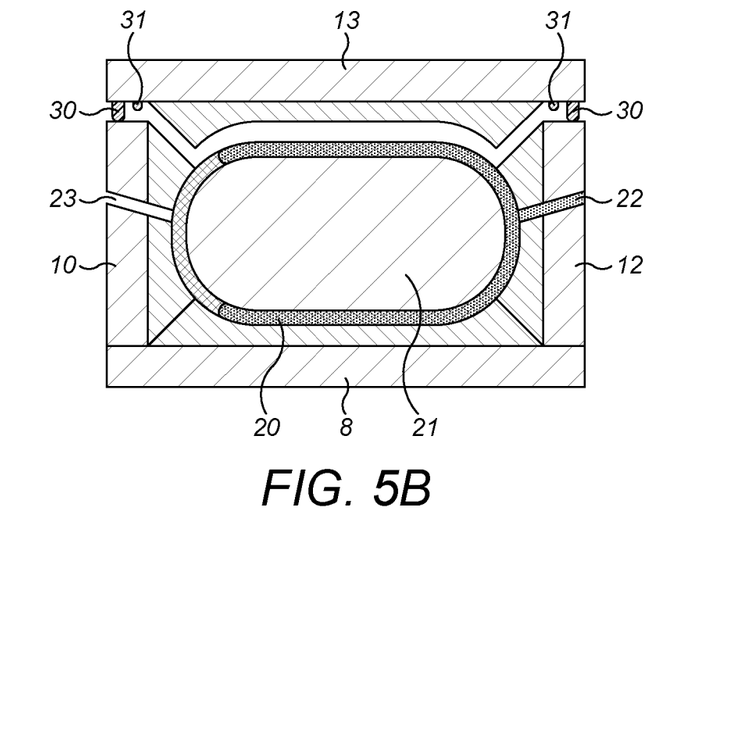
FIG. 5B shows a cut through view of the mould tool with a first stage of resin injection.
Figure 5C:
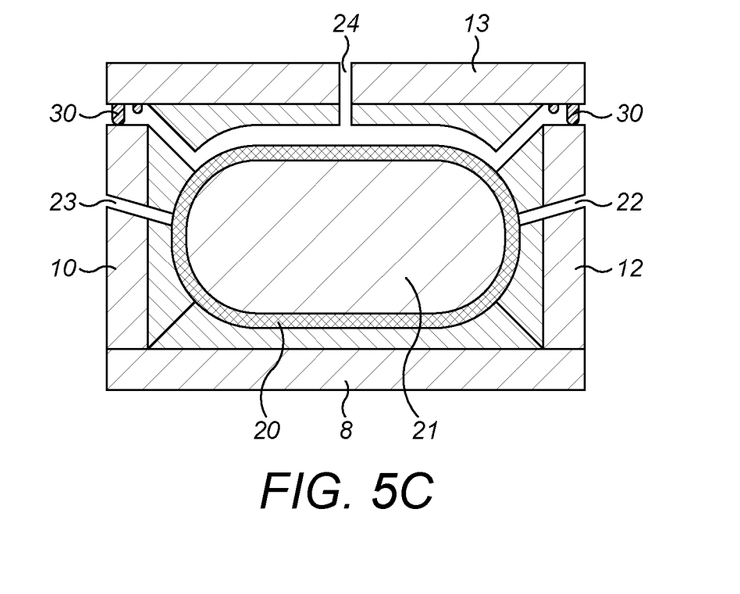
FIG. 5C shows a cut through view of the mould tool comprising an injection port in a second part of the mould tool.
Figure 6A:
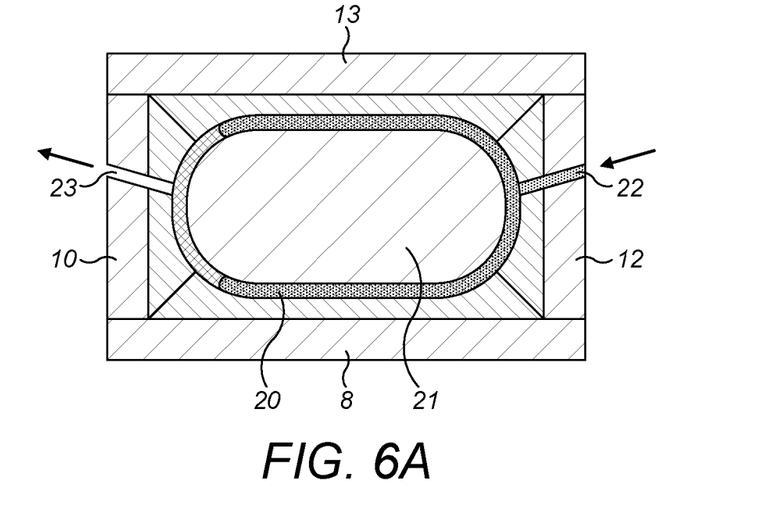
FIG. 6A shows a cut through view of the mould tool with a second part of the mould tool in an assembled position with the first stage of resin injection.
Figure 6B:
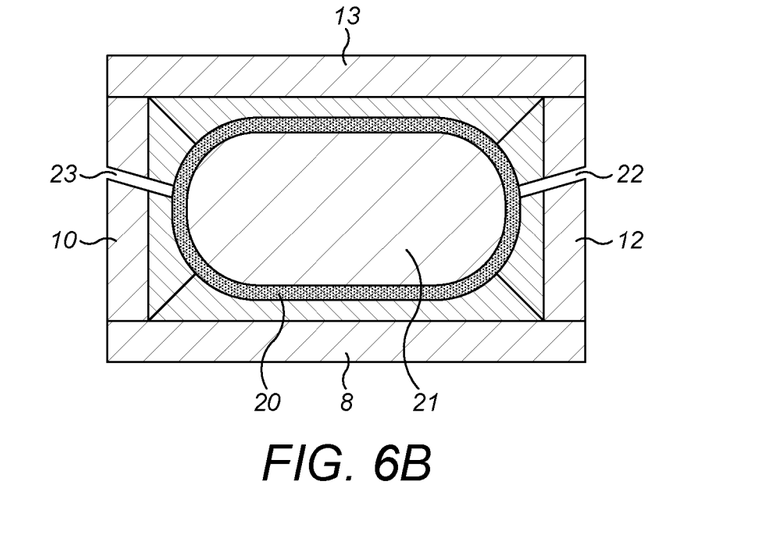
FIG. 6B shows a cut through view of the mould tool with a second stage of resin injection.

FIGS. 4 to 6 show a cut through view of the mould tool 15 in various configurations. FIG. 4A shows the mould tool 15 in which base part 8 and side parts 10 and 12 are shown in an assembled configuration. Top part 13 is shown raised from the position it takes when in an assembled configuration. As shown in FIG. 4, the mould tool cavity has been laid-up with reinforcing fibres 20. Those reinforcing fibres 20 have been laid-up around a support element 21 which defines the shape of the moulded part from within the moulded part. The support element 21 may be a rigid element or it may be caused to form that shape by inflation. For instance, the support element 21 may be a bladder that can be caused to form a rigid shape by inflation by gas or liquid and/or by filling with an incompressible material such as pellets. It will be appreciated that the actual configuration of the reinforcing fibres, mould shape and any support elements will be particular to the moulded part being formed.

The mould tool 15 may comprise at least one resin injection port 22. It will be appreciated that the mould tool 15 may comprise multiple resin injection ports 22, 24 as shown in FIGS. 4C, 4D and 5C. At least one resin injection port 22 may be present in the first mould tool parts 12, 8, 10. At least one resin injection port 24 may be present in the second mould tool part(s) 13. The same one or more of the resin injection ports 22, 24 may be used for each stage of resin delivery into the mould tool 15 described herein or the resin injection ports 22, 24 may be used in any combination during each stage of resin delivery into the mould tool 15. There may be different injection ports located on different tool parts to perform resin delivery to those different areas. Those resin injection ports located in different tool parts may be selected for use during various stages of resin delivery to provide a supply of resin most efficiently to those areas of the part being moulded.

Additionally, as shown in FIG. 4D, resin may be delivered into the mould tool using a dispensing device 25. This dispensing device 25 may be configured to deposit resin into the mould tool whilst the mould tool is in an open configuration. The dispensing device 25 may be attached to a robot arm 26 to permit the dispensing device to move relative to the mould tool.

In the example shown in FIGS. 4 to 6, the resin injection port(s) 22, 24 are configured so that resin can be injected into the mould cavity of the mould tool 15 to permit the resin to impregnate the reinforcing fibres 20. The resin injection port(s) 22, 24 may be attached to a resin supply line which can supply the resin under controllable pressure and/or flow rate. The mould tool 15 may comprise at least one vacuum port 23. The vacuum port 23 is configured so that negative pressure, relative to the atmosphere around the mould tool, can be applied to the interior of the mould tool. This assists in the drawing of the injected resin through the mould tool. Excess injected resin may flow out of vacuum port 23. This may occur to ensure that the reinforcing fibres are fully impregnated and that any air bubbles in the reinforcing fibres have been removed.

The injection of resin into the mould tool occurs by a method that comprises a multi-stage resin delivery process.

In one stage, resin may be injected whilst the mould tool is not in a fully assembled configuration.

Examples of this partially assembled configuration are shown in FIGS. 4A, 4C, and 4D. In this partially assembled configuration the plurality of mould tool pieces are in an assembled configuration apart from one of the mould tool pieces 13. The mould tool may be partially assembled with at least one tool piece 13 of the mould not in an assembled position. This partially assembled configuration defines an injection cavity into which resin can be injected and impregnate the reinforcing fibres. The injection of the resin into the mould in this case may be by deposition of the resin into the open portion of the mould tool or by injection of the resin into the open portion of the mould tool through one or more of the injection ports 22, 24. As shown FIG. 4A, it may be though at least a first injection port 22 located in at least one piece 12 of the first tool part 8, 10, 12. As shown in FIG. 4C, it may be through at least the first injection port 22 and/or through at least a second injection port 24 located in at least one piece 13 of the second tool part 13. In the case of injection through at least one second injection port 24 resin travels through the gap between the top mould tool piece 13 and the reinforcing fibre. The resin may be travel across this gap due to the effect of gravity or by means of pressure applied to the resin flow, for example by a resin flow control system or dispensing system. As shown in FIG. 4D, the injection of the resin may be by deposition of the resin into the open portion of the mould tool from a dispensing device 25. The other mould tool piece 13, in this case the top mould tool piece 13, is in an unassembled configuration. In the unassembled configuration of a tool piece, the mould tool piece, in this case the top mould tool piece 13 is not in contact with the other mould tool pieces thus meaning that the mould tool in is an open configuration.

Other examples of this partially assembled configuration are shown in FIGS. 5A, and 5C. In this partially assembled configuration the plurality of mould tool pieces are in an assembled configuration apart from one of the mould tool pieces 13. The other mould tool piece 13 is in a partially assembled configuration. In the partially assembled configuration, the mould tool piece 13 seals to adjacent mould tool pieces by a first seal 30. The first seal 30 may be comprised of a number of parts that together form first seal 30. In the partially assembled configuration, the other mould tool piece 13 is spaced away from the position in which the mould tool piece 13 defines at least part of the exterior of the moulded part 14. However, in this position the first seal 30 is in contact with adjacent tool pieces so as to seal against them to stop air flow past first seal 30 so that a vacuum can be pulled within the mould tool. This partially assembled configuration defines an injection cavity into which resin can be injected and impregnate the reinforcing fibres. In this case, as the mould tool is generally sealed, the injection can occur through one or more injection ports 22, 24. As shown FIG. 5A, it may be though at least a first injection port 22 located in at least one piece 12 of the first tool part 8, 10, 12. As shown in FIG. 5C, the injection can occur through at least the first injection port 22 and/or through at least a second injection port 24 located in at least one piece 13 of the second tool part 13.

FIGS. 4A and 5A show the mould tooling and laid-up fibre material prior to a stage of resin injection in the first and second examples of the partially assembled configuration of the mould tooling.

FIGS. 4B and 5B show the mould tooling and laid-up fibre material after one initial stage of resin injection. The resin injection around the reinforcing fibres is shown by the solid black part of the reinforced fibre region 20 that was filled with cross-hatches indicating the reinforcing fibres in FIGS. 4A and 5A. The one initial stage of resin injection has impregnated at least some, if not most, of the resin fibres. Although FIGS. 4B and 5B only show injection port 22, it will be appreciated that the injection may occur using other injection ports such as at least one injection port 24 located in at least one piece of second tool part 13.

In some embodiments, the initial resin injection stage that occurs when the mould tool is in the partially assembled configuration shown in FIGS. 4A, 4B, 4C, and/or 4D, may be followed by another initial resin injection stage that occurs when the mould is in the partially assembled configuration shown in FIGS. 5A, 5B, and/or 5C. In this case, which is not shown completely in FIG. 5A, there will be some resin wetting the reinforcing fibres when the mould tool piece 13 is in a partially assembled configuration. The closing of the tooling from the partially assembled, but open, configuration shown in FIGS. 4A, 4B, 4C and/or 4D to the partially assembled, but closed, configuration shown in FIGS. 5A, 5B and/or 5C may, in some situations, cause the pressing of the resin by the tooling. This can cause the resin to be distributed amongst further reinforcing fibres. Further resin is then injected into the mould whilst the mould tool piece 13 is in a partially assembled configuration.

In a further stage of resin injection, the mould tool is moved into the fully assembled configuration. In the example shown in FIGS. 4 and/or 5, this involves the moving of the final tool piece into its assembled position so that it defines at least part of the exterior surface of the moulded part. FIG. 6A shows the mould tooling in the fully assembled configuration. The movement of the tool piece into the assembled position causes the part of the mould tool that defines the exterior surface of the moulded part to contact the injected resin and put pressure on the resin. Any resin that is at a level above that of the exterior surface of the moulded part is forced to move by the movement of the tool piece. Thus, the resin is squeezed by the movement of the tool piece pushing it to impregnate other parts of the reinforcing material that were not impregnated with resin material prior to the tool pieces being positioned in their fully assembled position. FIG. 6A shows more of the crossed hatched region 20 as being solid black to show the movement of the resin to accommodate the closing of the tooling. In the case that the mould tooling starts from the position of the partially closed mould tooling shown in FIG. 5B, the closing of the tool piece against adjacent tool pieces may cause a second seal 31 to seal against the adjacent tool pieces. This second seal 31 may be configured to seal so that resin is unable to pass from one side of the seal to the other. As with first seal 30, second seal 31 may comprise more than one component that together forms second seal 31.

The further stage of resin injection occurs once the mould tooling is in the fully assembled configuration. This further stage of resin injection is used to fill any parts of the reinforcing fibres that have not been impregnated by resin. The further stage of resin injection can also be used to remove or collapse any air bubbles from the resin. The finished injection is shown in FIG. 6B where the reinforcing fibres have been fully impregnated with resin.

Although FIGS. 6A and 6B only show injection port 22, it will be appreciated that the injection may occur using other injection ports such as at least one injection port 24 located in at least one piece of second tool part 13.

Once the multi-stage injection process is complete, the resin can be cured to bind the resin to the reinforcing fibres to produce the moulded part. If necessary, the support element(s) 21 can be removed from inside the moulded part 14.

The multi-stage injection process is advantageous because it allows for a more rapid injection of resin during the initial stage(s) because the resin does not need to be forced through reinforcing fibres that are as tightly packed together as they may be when the mould tooling is fully assembled. The complete closing of the mould tooling can then cause further propagation of the resin prior to a further stage of resin injection that completes the impregnation. In the case that there is more than one initial stage of resin injection, the movement of the tooling to a closed partially assembled position may also cause propagation of the resin. This further stage may be undertaken more slowly and/or accurately to ensure full wetting of the reinforcing fibres but as this second stage only needs to complete the impregnation rather than starting from the initial injection point the time needed for this injection process can be reduced. This improves the process efficiency meaning more moulded parts can be produced for a given time period.

Figure 7:
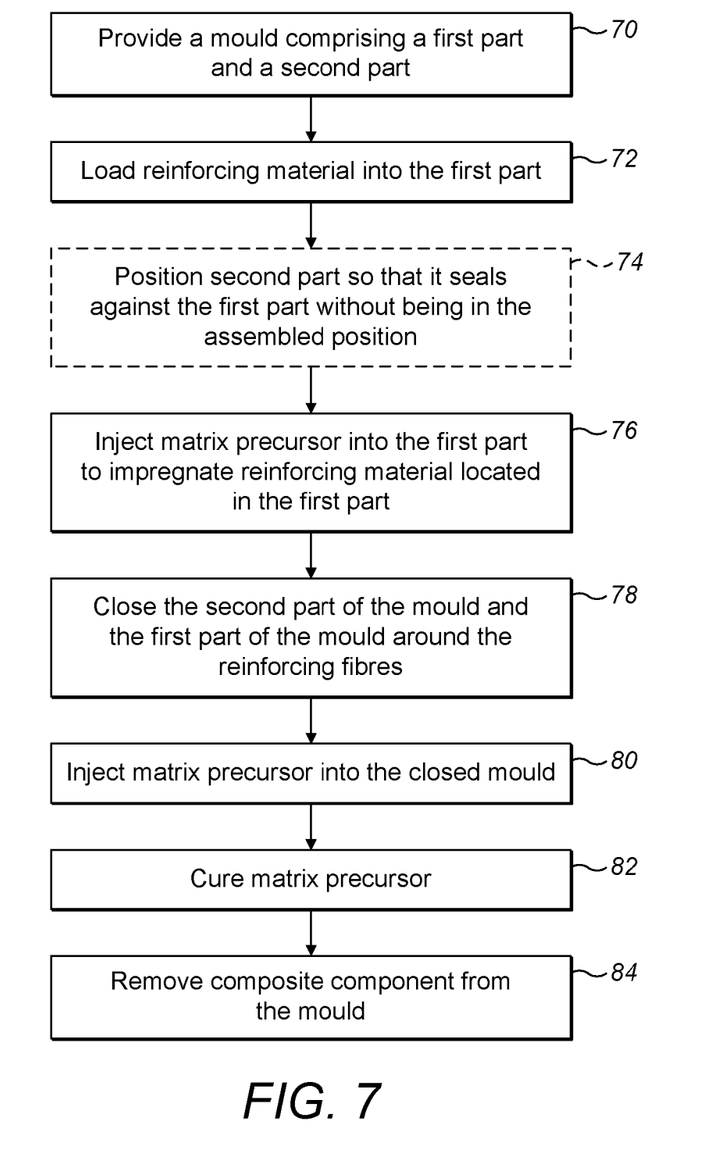
FIG. 7 shows a flow diagram of a method of forming a composite component.

FIG. 7 shows a flow chart of a multi-stage process described herein for forming a composite component.

Step 70 shows providing a mould that comprises a first part and a second part. Each of the first part and second part may comprise one or more mould pieces. As shown in FIGS. 2 to 6, the first part may comprise bottom 8 and side pieces 9, 10, 11, 12. As shown in FIGS. 2 to 6, second part may be formed of one piece. E.g. a top piece 13 in FIGS. 2 to 6. It will be appreciated that second part may be formed of more than one piece if the shape of the composite component being formed requires it.

Step 72 shows loading the first part of the mould with reinforcing material. The reinforcing material is loaded so as to be in position to define the shape of the composite component once moulding is completed. As discussed herein, one or more support elements may be loaded into the first part of the mould together with the reinforcing fibres. The support elements can assist in defining the shape of the composite component.

Step 74 shows the optional step of positioning the second part so that the second part seals against the first part of the mould. The sealing is implemented so that the second part is not in the assembled position. The second part is positioned to seal against the first part without being in an assembled position relative to the first part. Thus, the first part and second part are not assembled to define the exterior surface of the composite component whilst the second part seals against the first part. This is as shown in FIG. 5A.

Step 76 shows the injection of matrix precursor into the first part of the mould to impregnate reinforcing material located in the first part of the mould with the matrix precursor. This is as shown in FIGS. 4B and 5B. The injection of the matrix precursor into the first part of the mould may only inject enough matrix precursor to impregnate only some of the reinforcing material located in the first part of the mould. Thus, not all of the reinforcing material located in the first part of the mould will be impregnated, and/or fully wetted in this first injection step of step 76.

In the case that optional step 74 is present, the injection of the matrix precursor is into the region of the mould located between where the first part is sealed to the second part. This is as shown in FIG. 5B. This injection can occur by reducing the air pressure within the mould to assist in drawing the matrix precursor through the mould, reduce air entrapment and/or porosity in the resulting component. The reduction in pressure may be implemented by pumping air out of the mould.

If optional step 74 is not present, then the matrix precursor may be injected into the first part of the mould whilst the second part of the mould is not in contact with the first part of the mould. This is as shown in FIG. 4B. The matrix precursor may be injected into the first part of the mould whilst the second part of the mould is not forming a seal with the first part of the mould.

Step 78 shows the closing of the mould around the reinforcing fibres. The closing of the mould around the reinforcing fibres can involve the closing of the second part and the first part around the reinforcing material and injected matrix precursor to assemble the first and second parts. The assembly of the first and second parts defines an exterior surface of the composite component. This is as shown in FIG. 6A. The closing of the mould may cause the second part to contact with the matrix precursor. This contact can cause the second part to apply pressure to the matrix precursor and thus cause it to flow into previously unimpregnated reinforcing material.

Step 80 shows the injecting of matrix precursor into the closed mould to impregnate reinforcing material located between the first and second parts of the mould. This is as shown in FIG. 6B. The injection of matrix precursor into the closed mould can cause the full wetting of all of the reinforcing material within the mould.

Step 82 shows the curing of the matrix precursor within the mould. This curing may be by heating the matrix precursor to a temperature at which it forms a matrix. E.g. cross linking between the material that the matrix precursor is composed of.

Step 84 shows the removal of the composite component from the mould. Prior to removing the composite component from the mould, the mould may be opened by separating the first part and the second part. If either or both of the first and second parts are comprised of more than one piece those pieces may need to be separated or moved to enable the composite component to be removed.

Figure 8:
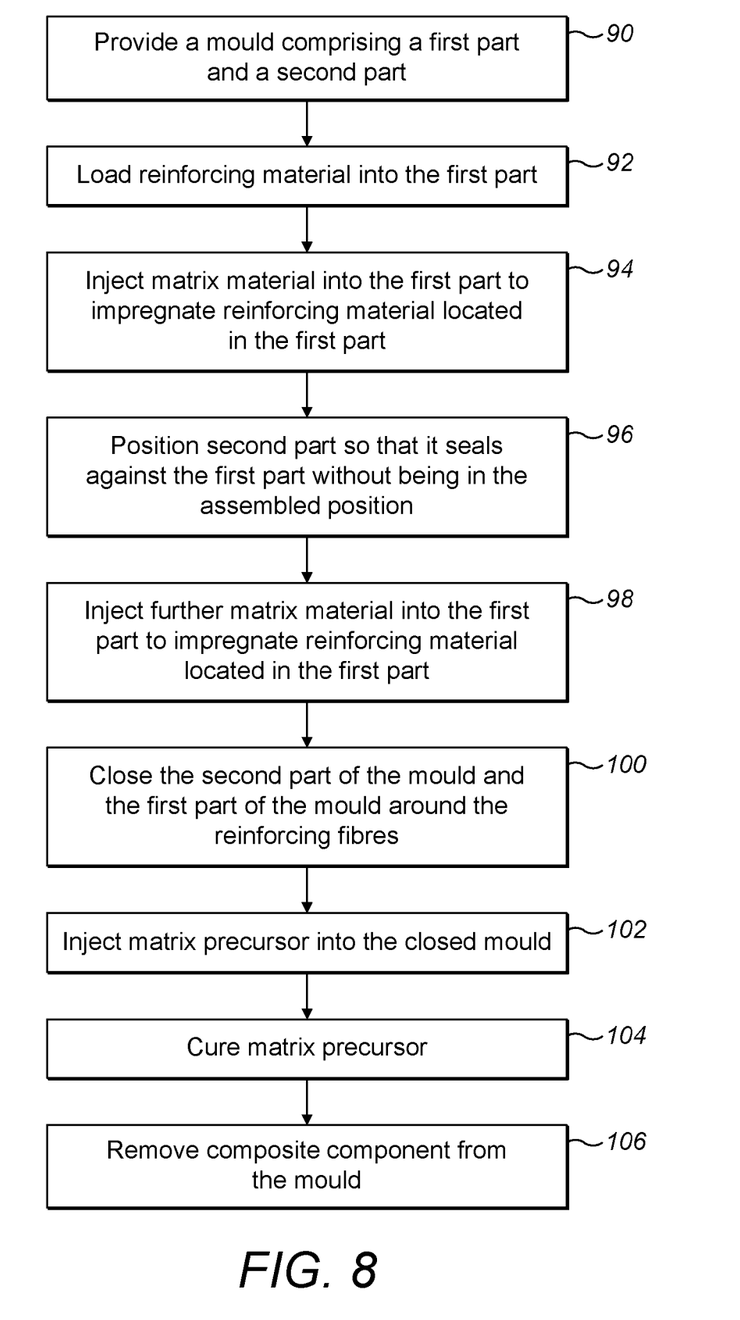
FIG. 8 shows a flow diagram of a method of forming a composite component.

FIG. 8 shows a flow chart of a multi-stage process described herein for forming a composite component.

Step 90 shows providing a mould that comprises a first part and a second part. Each of the first part and second part may comprise one or more mould pieces. As shown in FIGS. 2 to 6, the first part may comprise bottom 8 and side pieces 9, 10, 11, 12. As shown in FIGS. 2 to 6, second part may be formed of one piece. E.g. a top piece 13 in FIGS. 2 to 6. It will be appreciated that second part may be formed of more than one piece if the shape of the composite component being formed requires it.

Step 92 shows loading the first part of the mould with reinforcing material. The reinforcing material is loaded so as to be in position to define the shape of the composite component once moulding is completed. As discussed herein, one or more support elements may be loaded into the first part of the mould together with the reinforcing fibres. The support elements can assist in defining the shape of the composite component.

Step 94 shows the injection of matrix precursor into the first part of the mould to impregnate reinforcing material located in the first part of the mould with the matrix precursor whilst the mould is in an open partially assembled configuration. This is as shown in FIG. 4B. The injection of the matrix precursor into the first part of the mould may only inject enough matrix precursor to impregnate only some of the reinforcing material located in the first part of the mould.

Thus, not all of the reinforcing material located in the first part of the mould will be impregnated, and/or fully wetted in this first injection step of step 92. The injection of the resin matrix precursor may be by deposition of the matrix precursor into the open mould.

Step 96 shows positioning the second part so that the second part seals against the first part of the mould. The sealing is implemented so that the second part is not in an assembled position. The second part is positioned to seal against the first part without being in an assembled position relative to the first part. Thus, the first part and second part are not assembled to define the exterior surface of the composite component whilst the second part seals against the first part. The position of the mould tool pieces is as shown in FIG. 5A although in this embodiment some resin is be present in the mould tool.

Step 98 shows the further injection of matrix precursor into the first part of the mould to impregnate reinforcing material located in the first part of the mould with the matrix precursor. This is as shown in 5B. The injection of the matrix precursor into the first part of the mould may only inject enough matrix precursor to impregnate only some of the remaining non-fully wetted reinforcing material located in the first part of the mould. Thus, not all of the reinforcing material located in the first part of the mould will be impregnated, and/or fully wetted in this first injection step of step 98. The injection of the matrix precursor is into the region of the mould located between where the first part is sealed to the second part, as shown in FIG. 5B. This injection can occur by reducing the pressure within the mould to assist in drawing the matrix precursor through the mould. The reduction in pressure may be implemented by pumping air out of the mould.

Step 100 shows the closing of the mould around the reinforcing fibres. The closing of the mould around the reinforcing fibres can involve the closing of the second part and the first part around the reinforcing material and injected matrix precursor to assemble the first and second parts. The assembly of the first and second parts defines an exterior surface of the composite component. This is as shown in FIG. 6A. The closing of the mould may cause the second part to contact with the matrix precursor. This contact can cause the second part to apply pressure to the matrix precursor and thus cause it to flow into previously unimpregnated reinforcing material.

Step 102 shows the injecting of matrix precursor into the closed mould to impregnate reinforcing material located between the first and second parts of the mould. This is as shown in FIG. 6B. The injection of matrix precursor into the closed mould can cause the full wetting of all of the reinforcing material within the mould.

Step 104 shows the curing of the matrix precursor within the mould. This curing may be by heating the matrix precursor to a temperature at which it forms a matrix. E.g. cross linking between the material that the matrix precursor is composed of.

Step 106 shows the removal of the composite component from the mould. Prior to removing the composite component from the mould, the mould may be opened by separating the first part and the second part. If either or both of the first and second parts are comprised of more than one piece those pieces may need to be separated or moved to enable the composite component to be removed.

As discussed herein, the matrix precursor may be resin. The resin could be any suitable matrix material. Examples include polymers, preferably thermosetting polymers such as epoxies. The reinforcing material may be reinforcing fibres. They may be carbon fibres advantageously in the form of woven mats. The reinforcement material may comprise fibres having a tensile strength of greater than 300 MPa, more preferably greater than 500 MPa, more preferably greater than 800 MPa The process described above is especially advantageous for the manufacture of complex and/or large-dimension components. The moulded piece could, for example have a dimension greater than 1 m or greater than 2 m. The moulded piece could, for example, be a structural part of a vehicle (e.g. an automobile tub, an aircraft wing or a boat hull) or a part for another purpose such as a blade for a wind turbine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for forming a composite component, the method comprising:
   providing a mould comprising a first part of the mould and a second part of the mould, the first part and second part when assembled define an exterior surface of the composite component, the mould comprising a vacuum port;
   loading the first part of the mould with reinforcing material;
   injecting a first quantity of matrix precursor into the first part of the mould to partially impregnate reinforcing material located in the first part of the mould with said matrix precursor, the first quantity of matrix precursor being less than that required to fully impregnate the reinforcing material located in the first part of the mould, whilst (i) the second part of the mould is not in contact with the first part of the mould, (ii) the second part is in an unassembled configuration and (iii) the mould is in an open configuration when the second part of the mould is not in contact with the first part of the mould;
   closing the second part of the mould and the first part of the mould around the reinforcing material and the first quantity of matrix precursor to assemble the first part and second part to define an exterior surface of the composite component so that the mould is moved into a fully assembled configuration; and
   injecting matrix precursor into the closed mould to fully impregnate reinforcing material located between the first and second parts of the mould with said matrix precursor whilst the mould is in the fully assembled configuration wherein during injecting matrix precursor into the closed mould excess matrix precursor flows out of the vacuum port.

2. The method as claimed in claim 1, wherein injecting matrix precursor into the first part of the mould comprises depositing said matrix precursor using a dispensing device separate from the mould.

3. The method as claimed in claim 1, wherein injecting matrix precursor into the first part of the mould comprises injecting said matrix precursor through a channel in the second part of the mould.

4. The method as claimed in claim 1, wherein injecting matrix precursor into the first part of the mould to impregnate reinforcing material located in the first part of the mould comprises injecting the first quantity of matrix precursor into the first part of the mould whilst the second part of the mould is not in contact with the first part of the mould; and the method further comprises:
   positioning the second part of the mould, subsequent to injecting the first quantity of matrix precursor, so that the second part of the mould seals against the first part of the mould and that the first part and second part are not assembled to define the exterior surface of the composite component; and
   injecting a second quantity of matrix precursor between the first part of the mould and the second part of the mould to impregnate reinforcing material located between the first part of the mould and second part of the mould.

5. The method as claimed in claim 4, wherein injecting the second quantity of matrix precursor between the first part of the mould and the second part of the mould to impregnate reinforcing material located between the first part of the mould and second part of the mould comprises reducing pressure of air between the first part and the second part.

6. The method as claimed in claim 4, wherein injecting the first quantity of matrix precursor comprises injecting said matrix precursor through a first channel in the mould; and injecting a second quantity of matrix cursor comprises injecting said matrix precursor through a second channel in the mould.

7. The method as claimed in claim 6, wherein injecting matrix precursor into the closed mould comprises injecting said matrix precursor through a third channel in the mould.

8. The method as claimed in claim 1, the method comprising closing the second part of the mould and first part of the mould around the reinforcing material and said matrix precursor by moving the first and second parts of the mould closer together.

9. The method as claimed in claim 1, wherein closing the second part of the mould and the first part of the mould around the reinforcing material and said matrix precursor causes the second part of the mould to contact with said matrix precursor.

10. The method as claimed in claim 9, wherein causing the second part of the mould to contact with said matrix precursor causes said matrix precursor to impregnate reinforcing material not previously impregnated with said matrix precursor.

11. The method as claimed in claim 9, wherein causing the second part of the mould to contact with said matrix precursor causes said matrix precursor to fill space between the first part of the mould and the second part of the mould not previously filled with matrix precursor.

12. The method as claimed in claim 1, wherein injecting matrix precursor into the closed mould causes all the reinforcing material located between the first and second parts of the mould to be impregnated with said matrix precursor.

13. The method as claimed in claim 1, wherein the first part of the mould comprises a plurality of mould tool pieces.

14. The method as claimed in claim 1, wherein the second part of the mould comprises a plurality of mould tool pieces.

15. The method as claimed in claim 1, the method comprising, subsequent to injecting the matrix precursor into the closed mould, curing the matrix precursor.

16. The method as claimed in claim 1, the method comprising loading the first part of the mould with at least one support element to support reinforcing material in the first part of the mould.

17. The method as claimed in claim 1, wherein injecting matrix precursor into the closed mould comprises reducing the pressure within the closed mould.

18. The method as claimed in claim 1, wherein injecting a first quantity of matrix precursor into the first part of the mould to partially impregnate reinforcing material located in the first part of the mould with said matrix precursor occurs whilst the mould is in an unsealed configuration when the first part of the mould is not sealed to the second part of the mould.

19. The method as claimed in claim 1, wherein the first part of the mould comprises multiple tool pieces which when assembled together with the second part of the mould define the exterior surface of the composite component and injecting a first quantity of matrix precursor into the first part of the mould comprises injecting whilst the multiple tool pieces of the first part of the mould are assembled together.

20. A method for forming a composite component, the method comprising:

providing a mould comprising a first part of the mould and a second part of the mould, the first part and second part when assembled define an exterior surface of the composite component, the mould comprising a vacuum port;

loading the first part of the mould with reinforcing material;

injecting a first quantity of matrix precursor into the first part of the mould that is only enough matrix precursor to impregnate only some of the reinforcing material located in the first part of the mould with said matrix precursor whilst (i) the second part of the mould is not in contact with the first part of the mould, (ii) the second part is in an unassembled configuration and (iii) the mould is in an open configuration when the second part of the mould is not in contact with the first part of the mould;

closing the second part of the mould and the first part of the mould around the reinforcing material and the first quantity of matrix precursor to assemble the first part and second part to define an exterior surface of the composite component so that the mould is moved into a fully assembled configuration; and injecting matrix precursor into the closed mould to impregnate reinforcing material located between the first and second parts of the mould with said matrix precursor to cause full wetting of all of the reinforcing material whilst the mould is in the fully assembled configuration wherein during injecting matrix precursor into the closed mould excess matrix precursor flows out of the vacuum port.

* * * * *